(12) United States Patent  (10) Patent No.: US 9,651,351 B2
Lambert  (45) Date of Patent: May 16, 2017

(54) GAP ASSESSMENT TOOL

(71) Applicant: Toyota Motor Engineering & Manufacturing North America, Inc., Erlanger, KY (US)

(72) Inventor: Jeffrey D. Lambert, Georgetown, KY (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 74 days.

(21) Appl. No.: 14/810,154

(22) Filed: Jul. 27, 2015

(65) Prior Publication Data

US 2017/0030699 A1 Feb. 2, 2017

(51) Int. Cl.
*G01B 5/14* (2006.01)

(52) U.S. Cl.
CPC ..................... *G01B 5/14* (2013.01)

(58) Field of Classification Search
CPC .......................................................... G01B 5/14
USPC ......................................... 33/600, 613, 645
See application file for complete search history.

(56) References Cited

U.S. PATENT DOCUMENTS

| | | | |
|---|---|---|---|
| 4,606,129 A * | 8/1986 | Barrowman | G01B 7/31 33/501.09 |
| 4,731,931 A | 3/1988 | Goodman et al. | |
| 5,414,941 A * | 5/1995 | Carpenter | G01B 5/003 33/600 |
| 5,551,162 A * | 9/1996 | Struble | G01B 5/14 33/544.4 |
| 5,657,550 A * | 8/1997 | Struble | G01B 5/14 33/544.4 |
| 5,999,265 A | 12/1999 | Dalancon et al. | |
| 6,529,283 B1 | 3/2003 | Demopoulos et al. | |
| 7,100,298 B2 * | 9/2006 | Kiwada | G01B 3/22 33/613 |
| 7,690,128 B1 * | 4/2010 | Thompson | G01B 5/255 33/533 |
| 8,286,362 B2 | 10/2012 | Petersheim | |
| 2003/0217477 A1 * | 11/2003 | Thurmaier | H01R 13/6315 33/645 |
| 2008/0010846 A1 * | 1/2008 | Bingham | E04F 21/0092 33/613 |
| 2016/0046337 A1 * | 2/2016 | Niessen | B60Q 1/045 29/466 |

(Continued)

*Primary Examiner* — G. Bradley Bennett
(74) *Attorney, Agent, or Firm* — Christopher G. Darrow; Darrow Mustafa PC

(57) ABSTRACT

A gap assessment tool includes a base and an edge probe. The base fits to an exterior exhaust element of a vehicle, and includes the first of a pair of defined measurement locations. The edge probe is supported by the base for movement to an extended position in which, with the base fitted to the exterior exhaust element, the edge probe contacts an edge of an exterior body panel of the vehicle spaced from the exterior exhaust element, and includes the second of the pair of defined measurement locations. With the base fitted to the exterior exhaust element, and with the edge probe moved to the extended position and contacting the edge of the exterior body panel, a measurement between the pair of defined measurement locations is indicative of a part of a gap between the exterior exhaust element and the edge of the exterior body panel.

20 Claims, 5 Drawing Sheets

(56) References Cited

U.S. PATENT DOCUMENTS

2016/0146261 A1\* 5/2016 Yamaishi .................. F16D 3/40
29/407.05

\* cited by examiner

GAP ASSESSMENT TOOL

TECHNICAL FIELD

The embodiments disclosed herein relate to the assessment of gaps between exterior components in vehicles.

BACKGROUND

In vehicles equipped with exhaust systems for their engines, the culminations of the exhaust systems are often represented by one or more exterior exhaust elements. In many of these vehicles, each exterior exhaust element is spaced from the edge of an exterior body panel, leaving a gap between the exterior exhaust element and the edge of the exterior body panel.

Operators sometimes assess this gap, and either confirm it if it is satisfactory, or adjust and reassess it if it is not. The operator's assessment and ultimate confirmation of this gap can be performed during the vehicle's assembly, or after the vehicle's assembly, for example, as a part of outflow testing for the vehicle. Vehicle manufactures, among others, may desire to facilitate the operator's assessment of this gap.

SUMMARY

Disclosed herein are embodiments of a gap assessment tool. In one aspect, a gap assessment tool includes a base and an edge probe. The base fits to an exterior exhaust element of a vehicle, and includes the first of a pair of defined measurement locations. The edge probe is supported by the base for movement to an extended position in which, with the base fitted to the exterior exhaust element, the edge probe contacts an edge of an exterior body panel of the vehicle spaced from the exterior exhaust element, and includes the second of the pair of defined measurement locations. With the base fitted to the exterior exhaust element, and with the edge probe moved to the extended position and contacting the edge of the exterior body panel, a measurement between the pair of defined measurement locations is indicative of a part of a gap between the exterior exhaust element and the edge of the exterior body panel.

In another aspect, a gap assessment tool includes a base, an edge probe, an actuator and a handle. The base includes an adaptor that collars an exterior exhaust element of a vehicle to attach the base, via the adaptor, to the exterior exhaust element, and the first of a pair of defined measurement locations. The edge probe is supported by the base for movement to an extended position in which, with the base attached, via the adaptor, to the exterior exhaust element, the edge probe contacts an edge of an exterior body panel of the vehicle spaced from the exterior exhaust element, and includes the second of the pair of defined measurement locations. The actuator is between the base and the edge probe, and biases the edge probe away from the base in the direction of the edge probe's movement to the extended position to actuate the edge probe's movement to the extended position. The handle selectively operates the actuator. With the base attached, via the adaptor, to the exterior exhaust element, and with the edge probe moved to the extended position and contacting the edge of the exterior body panel, a measurement between the pair of defined measurement locations is indicative of a part of a gap between the exterior exhaust element and the edge of the exterior body panel.

These and other aspects will be described in additional detail below.

BRIEF DESCRIPTION OF THE DRAWINGS

The various features, advantages and other uses of the present embodiments will become more apparent by referring to the following detailed description and drawings in which.

DETAILED DESCRIPTION

This disclosure teaches a gap assessment tool that facilitates an operator's assessment of the gap, in a vehicle, between an exterior exhaust element and an edge of an exterior body panel spaced from the exterior exhaust element. More specifically, the gap assessment tool installs between the exterior exhaust element and the edge of the exterior body panel, and provides the operator with one or more pairs of defined measurement locations that respectively correspond to different parts of the gap. With the gap assessment tool, an operator can take easy, accurate and repeatable measurements indicative of the different parts of the gap between the respective pairs of defined measurement locations.

Figure 1:
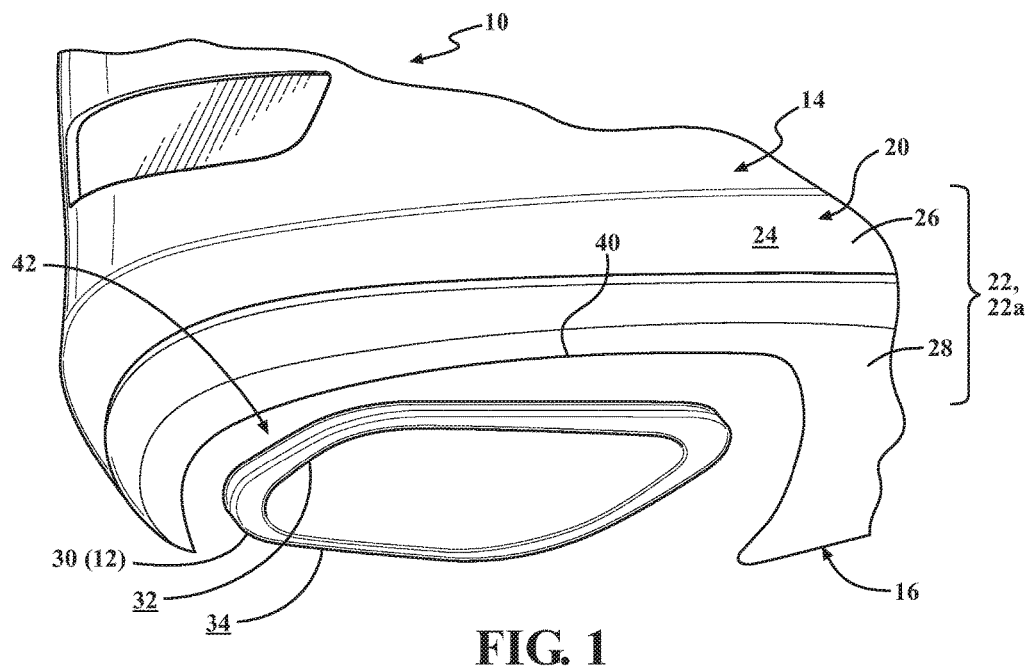
FIG. 1 is a rear view of a vehicle, showing an exterior exhaust element and an edge of an exterior body panel spaced from the exterior exhaust element.

A vehicle 10 equipped with an exhaust system 12 for its engine is shown in FIG. 1. In general, the vehicle 10 has a body 14 and an underbody 16. The vehicle 10 has a vehicle body structure 20 that includes, among other things, a number of exterior body panels 22 defining the exterior surface 24 of the body 14, some of which terminate at a juncture between the body 14 and the underbody 16.

In the vehicle 10, with the exhaust system 12 culminating at the rear end of the vehicle 10, these exterior body panels 22 are represented in FIG. 1 by the illustrated exterior body panel 22a, which is a bumper cover overlying a bumper at the rear end of the vehicle 10. The exterior body panel 22a may, as generally shown, implement a multiple piece construction and include, for instance, a main bumper cover portion 26 bordered in part by an auxiliary valance 28. Alternatively, the exterior body panel 22a could implement a single piece construction or another multiple piece construction including, for instance, the main bumper cover portion 26 but not the auxiliary valance 28. Although this description follows with reference to the exterior body panel 22a, it will be understood that its teachings are applicable in principle to other similar exterior body panels 22, including without limitation rear quarter panels and rocker panels, depending upon the configuration of the exhaust system 12, and particularly, where at the vehicle 10 the exhaust system 12 culminates.

The exhaust system 12 is suspended from the underbody 16 of the vehicle 10, and is routed along the underbody 16 from the engine of the vehicle 10 to the environment surrounding the vehicle 10. The components of the exhaust system 12 may include one or more catalytic converters, resonators and mufflers, and intermediary exhaust pipes between these components, as well as one or more tailpipes that extend from a penultimate downstream component, typically a muffler, and culminate the exhaust system 12.

In the vehicle 10, the culmination of the exhaust system 12 is represented by one or more exterior exhaust elements 30 adjacent the exterior surface 24 of the body 14 at or near the juncture between the body 14 and the underbody 16. As pointed out above, in the vehicle 10, the exhaust system 12 culminates at the rear end of the vehicle 10. Thus, in the vehicle 10, the exterior exhaust element 30 is adjacent the exterior surface 24 of the body 14 defined by the exterior body panel 22a at the rear end of the vehicle 10. Although this description follows with reference to a single exterior exhaust element 30, it will be understood that its teachings are applicable in principle to other exterior exhaust elements 30 in the vehicle 10, if present.

The exterior exhaust element 30 is included in or otherwise associated with the exhaust system 12. The exterior exhaust element 30 may be the terminal end of a tailpipe that culminates the exhaust system 12, for instance, or an exhaust baffle, an exhaust tip or other exhaust finisher, whether attached at the terminal end of a tailpipe that culminates the exhaust system 12, or attached otherwise to the vehicle 10, for example to an exterior body panel 22, such as the exterior body panel 22a, to simulate the terminal end of a tailpipe that culminates the exhaust system 12.

The exterior exhaust element 30 is generally tubular, with an inside surface 32 and an outside surface 34. As shown, the exterior exhaust element 30 includes a single tube incorporating the entirety of its inside surface 32 and its outside surface 34. In alternative examples, the exterior exhaust element 30 could, for instance, include multiple tubes. In these alternative examples of the exterior exhaust element 30, the multiple tubes will incorporate respective portions of its total inside surface 32 and its total outside surface 34.

As shown, the exterior exhaust element 30 is adjacent the exterior surface 24 of the body 14 defined by the exterior body panel 22a. More specifically, the exterior exhaust element 30 is spaced from an edge 40 of the exterior body panel 22a defining the exterior surface 24 of the body 14, leaving a gap 42 between the exterior exhaust element 30 and the edge 40 of the exterior body panel 22a along the circumferential portions of the exterior exhaust element 30 where its outside surface 34 opposes the edge 40 of the exterior body panel 22a.

For the illustrated exterior body panel 22a, which terminates at the juncture between the body 14 and the underbody 16, the edge 40 is a free outboard edge of the exterior body panel 22a at the juncture between the body 14 and the underbody 16. Alternatively, the edge 40 could be an interior edge of the exterior body panel 22a near the juncture between the body 14 and the underbody 16, for example.

The edge 40 of the exterior body panel 22a may optionally be contoured to frame the exterior exhaust element 30, either in whole or, as shown, in part. According to these configurations, the edge 40 of the exterior body panel 22a may be contoured to approximate the outside surface 34 of the exterior exhaust element 30 along one, some or all of the circumferential portions of the exterior exhaust element 30 where its outside surface 34 opposes the edge 40 of the exterior body panel 22a, with the edge 40 of the exterior body panel 22a framing the exterior exhaust element 30 along those circumferential portions.

It will be understood that the gap 42 between the exterior exhaust element 30 and the edge 40 of the exterior body panel 22a is subject to observation. An observer's perception of the quality of the vehicle 10 can be adversely impacted if the gap 42 is too large, too small, uneven, inconsistent with a gap 42 between another exterior exhaust element 30 and the edge 40 of the exterior body panel 22a in the same vehicle 10, inconsistent with the gaps 42 between the exterior exhaust elements 30 and the edges 40 of the exterior body panels 22a in like vehicles 10 or otherwise unsatisfactory. Accordingly, operators sometimes assess the gap 42 between the exterior exhaust element 30 and the edge 40 of the exterior body panel 22a, and either confirm it if it is satisfactory, or adjust and reassess it if it is not.

An operator may assess the gap 42, for instance, by taking direct measurements of one or more parts of the gap 42. However if, for instance, the exterior exhaust element 30 sits forward or rearward from the edge 40 of the exterior body panel 22a, or the exterior exhaust element 30 or the edge 40 of the exterior body panel 22a, or both, have smooth profiles without identifiable features to measure between, as they do in the vehicle 10 shown in FIG. 1, an operator may find it difficult to take direct measurements of one or more parts of the gap 42, and to maintain accuracy and repeatability in these direct measurements.

Figure 2:
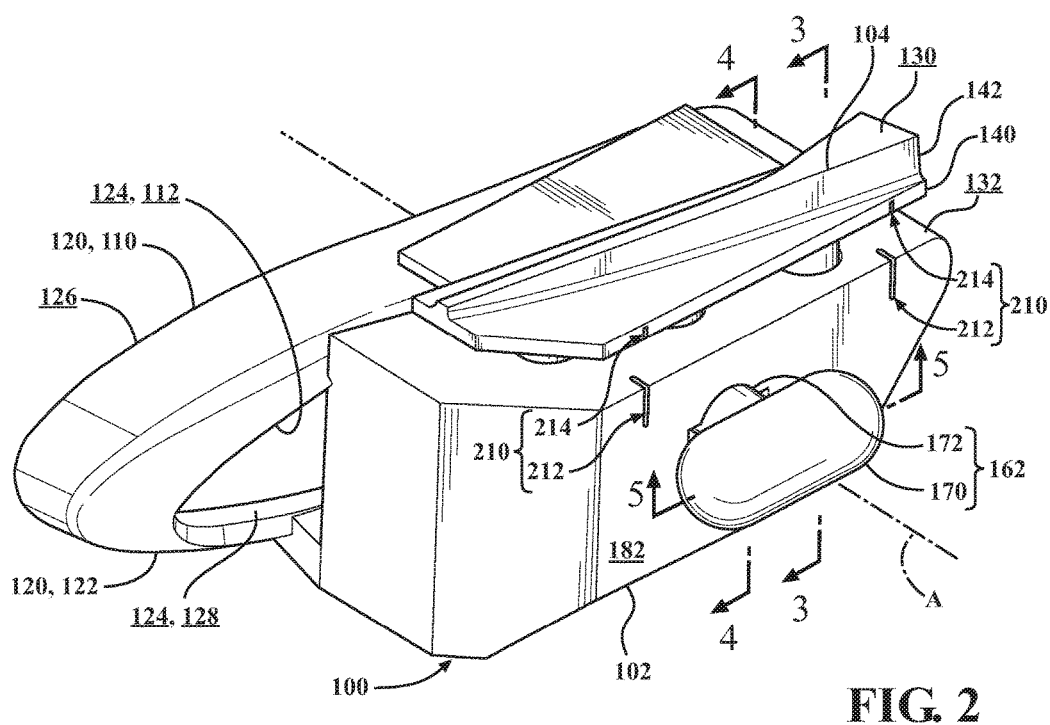
FIG. 2 is a perspective view of a gap assessment tool that installs between the exterior exhaust element and the edge of the exterior body panel and facilitates an operator's assessment of the gap between them, showing a base that fits to the exterior exhaust element, an edge probe supported by the base for movement to an extended position to contact the edge of the exterior body panel, pairs of defined measurement locations divided between the base and the edge probe and a handle supported by the base that selectively operates an actuator's actuation of the edge probe's movement to the extended position.

A gap assessment tool 100 is shown in FIG. 2 that facilitates an operator's assessment of the gap 42 in the vehicle 10 between the exterior exhaust element 30 and the edge 40 of the exterior body panel 22a by promoting accurate and repeatable measurements indicative of one or more different parts of the gap 42.

The gap assessment tool 100 is generally configured for installation between the exterior exhaust element 30 and the edge 40 of the exterior body panel 22a. The gap assessment tool 100 includes a base 102 configured for fitment to the exterior exhaust element 30, and an edge probe 104 supported by the base 102 and configured for contacting the edge 40 of the exterior body panel 22a while the base 102 is fitted to the exterior exhaust element 30. The base 102 has an axis A that axially aligns or otherwise aligns in parallel with the exterior exhaust element 30 with the installation of the gap assessment tool 100 between the exterior exhaust element 30 and the edge 40 of the exterior body panel 22a.

The base 102 can be configured for fitment to the exterior exhaust element 30 in any manner supportive of the overall installation of the gap assessment tool 100 between the exterior exhaust element 30 and the edge 40 of the exterior body panel 22a. As shown, the base 102 includes a primary engagement portion 110 configured for positioning in engagement against the exterior exhaust element 30 in opposition to the contact with the edge 40 of the exterior body panel 22a by the edge probe 104.

In the illustrated example of the base 102, the primary engagement portion 110 defines a primary engagement surface 112 sized and shaped for positioning in engagement against the outside surface 34 of the exterior exhaust element 30 along a circumferential portion of the exterior exhaust element 30 where its outside surface 34 opposes the edge 40 of the exterior body panel 22a. Alternatively, or additionally, the primary engagement portion 110 could, for example, define a primary engagement surface 112 sized and shaped for positioning in engagement against the inside surface 32 of the exterior exhaust element 30 along a circumferential portion of the exterior exhaust element 30 opposing that where its outside surface 34 opposes the edge 40 of the exterior body panel 22a.

In these or other examples of the primary engagement portion 110, the primary engagement surface 112 defined by the primary engagement portion 110 may, as shown, be sized and shaped to generally match the contour of the outside surface 34 of the exterior exhaust element 30 or the inside surface 32 of the exterior exhaust element 30, as the case may be, for positioning in continuous engagement against them. Alternatively, the primary engagement surface 112 defined by the primary engagement portion 110 could, for example, be sized and shaped for positioning in engagement at one or more discrete points against the outside surface 34 of the exterior exhaust element 30 or the inside surface 32 of the exterior exhaust element 30, as the case may be.

Beyond being configured for fitment to the exterior exhaust element 30, the base 102 can optionally be configured for attachment to the exterior exhaust element 30 in any manner supportive of the overall installation of the gap assessment tool 100 between the exterior exhaust element 30 and the edge 40 of the exterior body panel 22a.

As shown, the base 102 includes an adaptor 120 with an auxiliary engagement portion 122 configured for positioning in attaching engagement with the exterior exhaust element 30. In the illustrated example of the base 102, both the primary engagement portion 110 and the auxiliary engagement portion 122 are included in the adaptor 120, and the auxiliary engagement portion 122 is configured for positioning in attaching engagement with the exterior exhaust element 30 in collaboration with the positioning of the primary engagement portion 110 in engagement against the exterior exhaust element 30 in opposition to the contact with the edge 40 of the exterior body panel 22a by the edge probe 104. According to this example of the base 102, in order to fit and attach the base 102, via the adaptor 120, to the exterior exhaust element 30, the primary engagement portion 110 is configured for positioning in engagement against the exterior exhaust element 30 in opposition to the contact with the edge 40 of the exterior body panel 22a by the edge probe 104, as described above, and the auxiliary engagement portion 122 is configured for positioning in engagement against the exterior exhaust element 30 in opposition to the primary engagement portion 110 about the exterior exhaust element 30.

The adaptor 120 may, as shown, be generally tubular and extend along the axis A of the base 102, with an inside surface 124 and an outside surface 126. The inside surface 124 of the adaptor 120 is sized and shaped for positioning in engagement against the outside surface 34 of the exterior exhaust element 30, configuring to adaptor 120 to, in use, collar the exterior exhaust element 30 to fit and attach the base 102, via the adaptor 120, to the exterior exhaust element 30 and to align the axis A of the base 102 in parallel with the exterior exhaust element 30.

According to this example of the base 102, the inside surface 124 of the adaptor 120 incorporates the primary engagement surface 112 defined by the primary engagement portion 110 which, as described above, is sized and shaped for positioning in engagement against the outside surface 34 of the exterior exhaust element 30 along a circumferential portion of the exterior exhaust element 30 where its outside surface 34 opposes the edge 40 of the exterior body panel 22a, as well as an auxiliary engagement surface 128 defined by the auxiliary engagement portion 122 sized and shaped for positioning in engagement against the outside surface 34 of the exterior exhaust element 30 along a circumferential portion of the exterior exhaust element 30 opposing that where its outside surface 34 opposes the edge 40 of the exterior body panel 22a. Alternatively, or additionally, with this primary engagement surface 112, the auxiliary engagement portion 122 could, for example, define an auxiliary engagement surface 128 sized and shaped for positioning in engagement against the inside surface 32 of the exterior exhaust element 30 along the circumferential portion of the exterior exhaust element 30 where its outside surface 34 opposes the edge 40 of the exterior body panel 22a.

According to alternative examples of the base 102 with the primary engagement surface 112 defined by the primary engagement portion 110 sized and shaped for positioning in engagement against the inside surface 32 of the exterior exhaust element 30 along a circumferential portion of the exterior exhaust element 30 opposing that where its outside surface 34 opposes the edge 40 of the exterior body panel 22a, the auxiliary engagement portion 122 could, for example, define an auxiliary engagement surface 128 sized and shaped for positioning in engagement against the outside surface 34 of the exterior exhaust element 30 along a circumferential portion of the exterior exhaust element 30 opposing that where its outside surface 34 opposes the edge 40 of the exterior body panel 22a, or against the inside surface 32 of the exterior exhaust element 30 along the circumferential portion of the exterior exhaust element 30 where its outside surface 34 opposes the edge 40 of the exterior body panel 22a.

In these or other examples of the auxiliary engagement portion 122, the auxiliary engagement surface 128 defined by the auxiliary engagement portion 122 may, as shown, be sized and shaped to generally match the contour of the outside surface 34 of the exterior exhaust element 30 or the inside surface 32 of the exterior exhaust element 30, as the case may be, for positioning in continuous engagement against them. Alternatively, the auxiliary engagement surface 128 defined by the auxiliary engagement portion 122 could, for example, be sized and shaped for positioning in engagement at one or more discrete points against the outside surface 34 of the exterior exhaust element 30 or the inside surface 32 of the exterior exhaust element 30, as the case may be.

As shown, the edge probe 104 is configured for contact with the edge 40 of the exterior body panel 22a. In the illustrated example of the gap assessment tool 100, the edge probe 104 defines a contacting surface 130, and the contact with the edge 40 of the exterior body panel 22a by the edge probe 104 is made at the contacting surface 130. The contacting surface 130 is sized and shaped for positioning in engagement against the edge 40 of the exterior body panel 22a. The contacting surface 130 may, as shown, be sized and shaped to generally match the contour of the edge 40 of the exterior body panel 22a for positioning in continuous engagement against the edge 40 of the exterior body panel 22a. Alternatively, the contacting surface 130 could, for example, be sized and shaped for positioning in engagement at one or more discrete points against the edge 40 of the exterior body panel 22a.

Figure 7A:
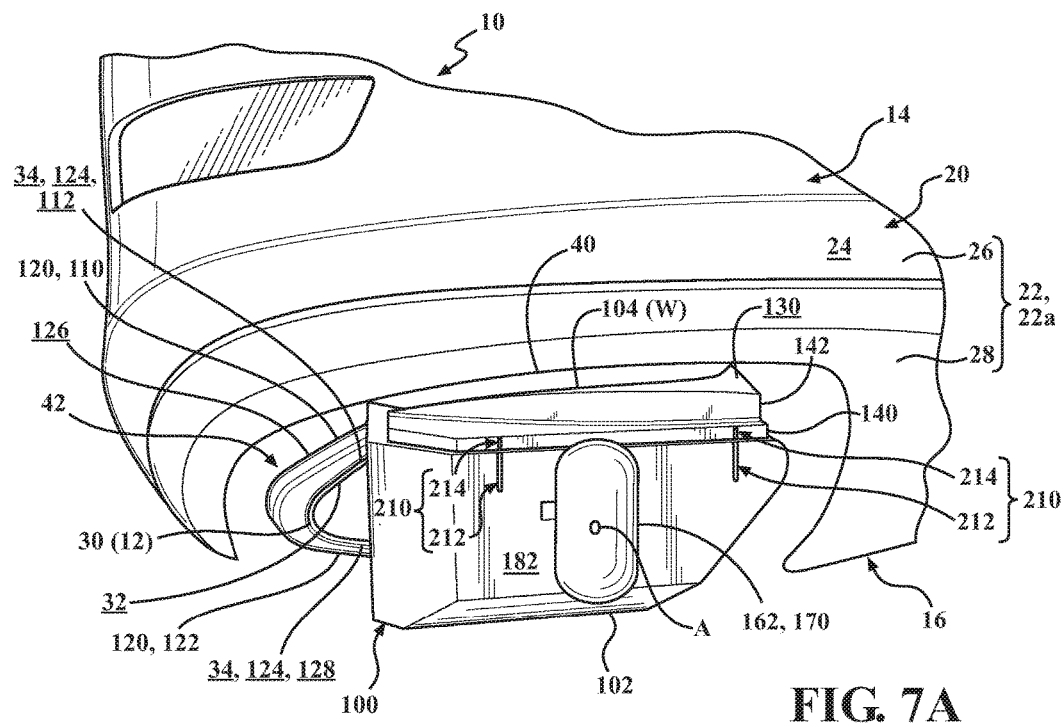
FIG. 7A is a rear view of the vehicle showing the gap assessment tool partially installed between the exterior exhaust element and the edge of the exterior body panel, with the base fitted to the exterior exhaust element.

As shown with additional reference to FIG. 7A, with the base 102 fitted to the exterior exhaust element 30, the gap assessment tool 100 is partially installed between the exterior exhaust element 30 and the edge 40 of the exterior body panel 22a. To complete this installation, as shown with additional reference to FIG. 7B, the edge probe 104 is moved to an extended position E in which the edge probe 104 contacts the edge 40 of the exterior body panel 22a.

In the illustrated example of the gap assessment tool 100, the base 102 includes the adaptor 120, as explained above, and the remainder of the base 102 is configured, among other things, to support the edge probe 104 for movement to the extended position E in which the edge probe 104 contacts the edge 40 of the exterior body panel 22a from a withdrawn position W. Although this description follows primarily with reference to the movement of the edge probe 104 to the extended position E, it will be understood that the base 102 may likewise support the edge probe 104 for return movement to the withdrawn position W.

As shown, the movement of the edge probe 104 to the extended position E is radially from the axis A of the base 102 that aligns in parallel with the exterior exhaust element 30 with the installation of the gap assessment tool 100 between the exterior exhaust element 30 and the edge 40 of the exterior body panel 22a. The base 102 defines a ledge 132 oriented transversely to the axis A to face the edge 40 of the exterior body panel 22a with the base 102 fitted to the exterior exhaust element 30. The edge probe 104 is positioned atop the ledge 132 to similarly face the edge 40 of the exterior body panel 22a with the base 102 fitted to the exterior exhaust element 30, and is supported for movement away from the ledge 132 to the extended position E, and towards the ledge 132 for return movement to the withdrawn position W.

Figure 7B:
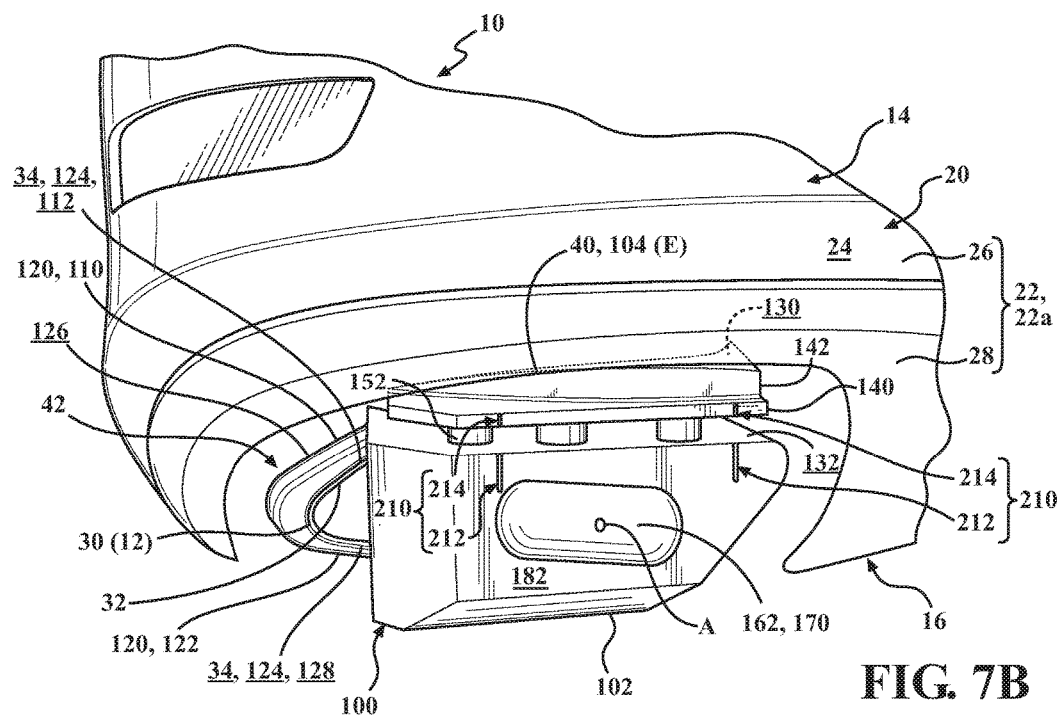
FIG. 7B is a rear view of the vehicle showing the gap assessment tool installed between the exterior exhaust element and the edge of the exterior body panel, with the base fitted to the exterior exhaust element, and with the edge probe moved to the extended position and contacting the edge of the exterior body panel.

The withdrawn position W is generally permissive of the fitment of the base 102 to the exterior exhaust element 30. According to the illustrated example of the gap assessment tool 100, in the withdrawn position W, the edge probe 104 is relatively closer to the ledge 132 in avoidance of interference with the edge 40 of the exterior body panel 22a as the base 102 is fitted to the exterior exhaust element 30, and as shown in FIG. 7A, with the base 102 fitted to the exterior exhaust element 30, occupies the gap 42 between the exterior exhaust element 30 and the edge 40 of the exterior body panel 22a. With its movement to the extended position E, the edge probe 104 contacts the edge 40 of the exterior body panel 22a, as shown in FIG. 7B, to complete the installation of the gap assessment tool 100 between the exterior exhaust element 30 and the edge 40 of the exterior body panel 22a.

In the illustrated example of the gap assessment tool 100, the edge probe 104 includes a platform 140 adjacent the ledge 132 of the base 102 and oriented similarly to the ledge 132 transversely to the axis A to face the edge 40 of the exterior body panel 22a with the base 102 fitted to the exterior exhaust element 30. According to this example, the contacting surface 130 is defined at the leading edge of an elongate flange 142 extending from the platform 140 transversely to the axis A and radially from the axis A away from the ledge 132 and the remainder of the base 102.

Figure 3:
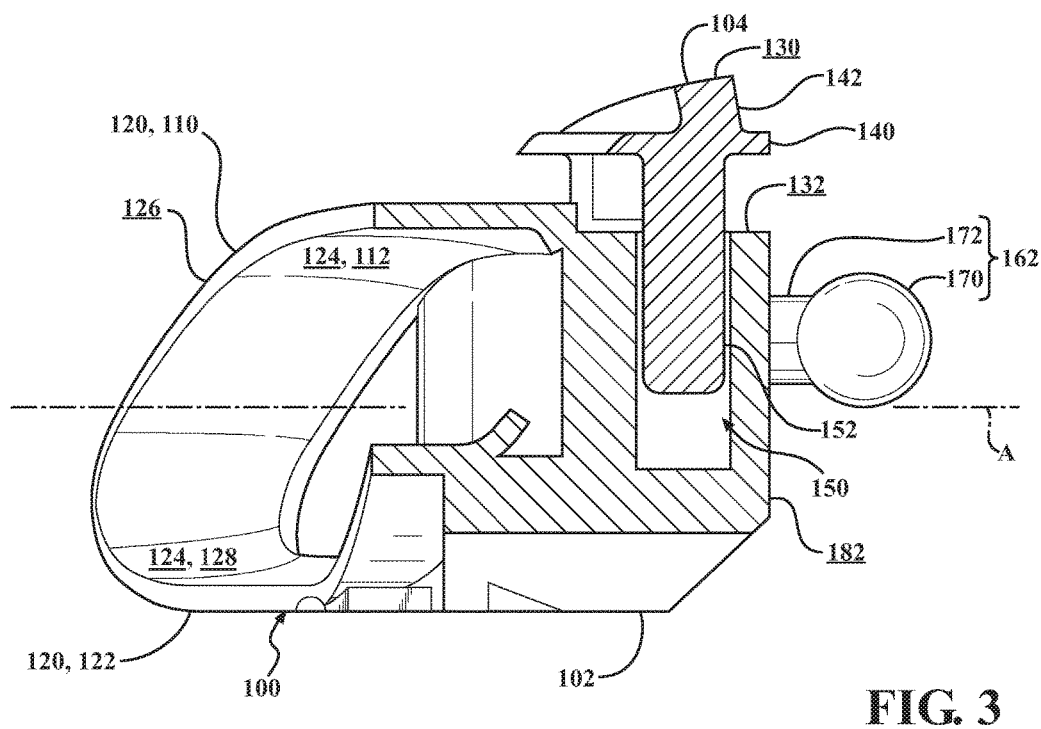
FIG. 3 is a cross section of the gap assessment tool taken along the line 3-3 in FIG. 2, showing features of the edge probe's support by the base.

As shown with additional reference to FIG. 3, the base 102 defines guide slots 150 opening from the ledge 132 and extending in the direction of the movement of the edge probe 104 to the extended position E which, as described above, is radially from the axis A. The edge probe 104 includes complementary guide shafts 152 extending from the underside of the platform 140 opposite the flange 142. The guide shafts 152 are supported in respective of the guide slots 150 in sliding engagement permissive of the movement of the edge probe 104 as a whole to the extended position E, as well as the return movement of the edge probe 104 to the withdrawn position W. The base 102 may, as shown, define two guide slots 150, with the edge probe 104 including two complementary guide shafts 152 supported in respective of the two guide slots 150, although alternatively the base 102 could, for example, define one guide slot 150, with the edge probe 104 including one complementary guide shaft 152 supported in the guide slot 150, or more than two guide slots 150, with the edge probe 104 including more than two complementary guide shafts 152 supported in respective of the guide slots 150.

It will be understood that, in general, the desire to assess the gap 42 between the exterior exhaust element 30 and the edge 40 of the exterior body panel 22a assumes the possibility of variability in the gap 42. Accordingly, in the gap assessment tool 100, the guide slots 150 and the complementary guide shafts 152 are configured to accommodate a range of movement of the edge probe 104 that includes multiple different extended positions E. With this configuration, for a given vehicle 10, the gap assessment tool 100 adjusts to the gap 42 between its exterior exhaust element 30 and the edge 40 of its exterior body panel 22a by setting the extended position E depending upon the movement of the edge probe 104 necessary for the edge probe 104 to contact the edge 40 of the exterior body panel 22a during the installation of the gap assessment tool 100 between the exterior exhaust element 30 and the edge 40 of the exterior body panel 22a.

Furthermore, the guide slots 150 and the complementary guide shafts 152 can optionally be sized to define play between them permissive of a certain amount of deflection of the edge probe 104 from its movement to the extended position E in order to accommodate, for instance, unevenness in the gap 42 between the exterior exhaust element 30 and the edge 40 of the exterior body panel 22a, the exterior exhaust element 30 sitting too far forward or too far rearward from the edge 40 of the exterior body panel 22a or a combination of these during the installation of the gap assessment tool 100 between the exterior exhaust element 30 and the edge 40 of the exterior body panel 22a.

Figure 4:
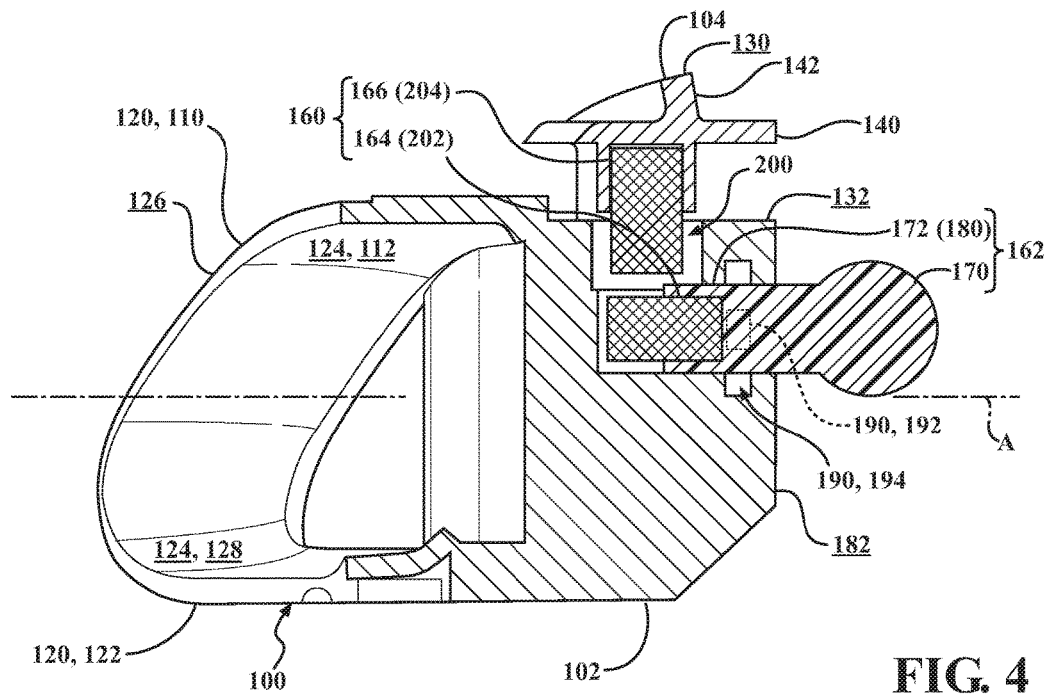
FIG. 4 is a cross section of the gap assessment tool taken along the line 4-4 in FIG. 2, showing features of the handle's support by the base, a handle retaining structure, the actuator's actuation of the edge probe's movement to the extended position and the handle's selective operation of the actuator.
Figure 5:
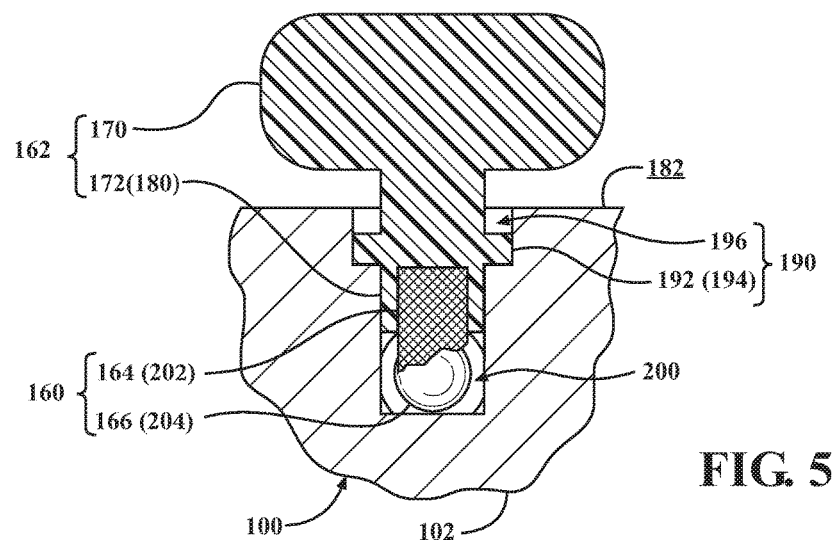
FIG. 5 is a cross section of the gap assessment tool taken along the line 5-5 in FIG. 2, showing additional features of the actuator's actuation of the edge probe's movement to the extended position and the handle's selective operation of the actuator.

As shown with additional reference to FIGS. 4 and 5, the gap assessment tool 100 may include an actuator 160 between the base 102 and the edge probe 104 for actuating the movement of the edge probe 104 to the extended position E, as well as a handle 162 that selectively operates the actuator 160. The actuator 160 may, among other things, be configured to bias the edge probe 104 away from the base 102 in the direction of the movement of the edge probe 104 to the extended position E for its accommodated range of movement. The amount of bias that the movement of the edge probe 104 to the extended position E is subjected to by the actuator 160 under this configuration can be selected, for example, to ensure secure installation of the gap assessment tool 100 between the exterior exhaust element 30 and the edge 40 of the exterior body panel 22a, while avoiding deformation of the exterior exhaust element 30 or the edge 40 of the exterior body panel 22a.

In the illustrated example of the actuator 160, the actuator 160 includes a first magnet 164 positioned against the base 102 and a second magnet 166 positioned against the edge probe 104. In general, in this example of the actuator 160, the movement of the edge probe 104 to the extended position E is realized by the application of a magnetic force that biases the edge probe 104 away from the base 102 in the direction of the movement of the edge probe 104 to the extended position E.

This magnetic force is generated by the placement of the first magnet 164 in magnetic opposition to the second magnet 166 in the direction of the movement of the edge probe 104 to the extended position E. Although the placement of the first magnet 164 in magnetic opposition to the second magnet 166 in the direction of the movement of the edge probe 104 to the extended position E could, for instance, be permanent, according to the illustrated example of the gap assessment tool 100 including a handle 162 that selectively operates the actuator 160, this placement is selectively implemented by an operator's manipulation of the handle 162.

More specifically, in the illustrated example of the gap assessment tool 100, the second magnet 166 is retentively supported by the edge probe 104. The first magnet 164, on the other hand, is retentively supported by the handle 162, which in turn is supported by the base 102 for selective movement by an operator that, when imparted to the first magnet 164, places the first magnet 164 in magnetic opposition to the second magnet 166 in the direction of the movement of the edge probe 104 to the extended position E.

As shown, the handle 162 includes a handle knob 170 arranged at the outside of the base 102 for manipulation by an operator. The handle 162 further includes a handle shaft 172 that, as shown, extends from the handle knob 170. The base 102 defines a handle slot 180, and the handle shaft 172 is supported in the handle slot 180 in rotational engagement permissive of rotation of the handle 162 as a whole. The handle slot 180 may, as shown, open from a front surface 182 of the base 102 opposing the adaptor 120 to arrange the handle knob 170 at the front surface 182 for access by an operator.

Figure 6A:
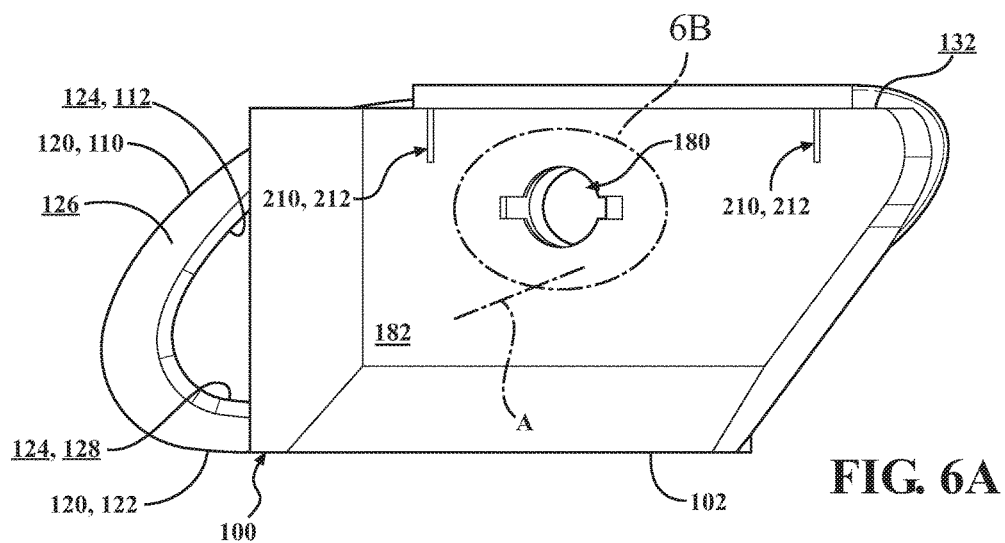
FIGS. 6A and 6B are perspective views of the base, showing additional features of the handle retaining structure.
Figure 6B:
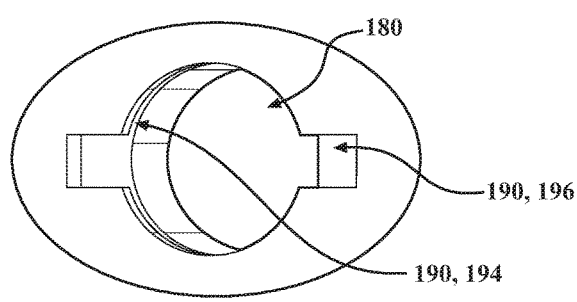

As shown with additional reference to FIGS. 6A and 6B, in order to support retention of the handle shaft 172 in the handle slot 180, the gap assessment tool 100 may include a handle retaining structure 190. The illustrated example of the handle retaining structure 190 includes opposed shoulder surfaces 192 extending radially from the handle shaft 172, and a complementary retention groove 194 defined by the base 102 and opening radially from a medial portion of the handle slot 180 about its circumference. In order to support removable retention of the handle shaft 172 in the handle slot 180, the handle retaining structure 190 may additionally include, as shown, keyways 196 defined by the base 102 and opening radially from the handle slot 180 between the retention groove 194 and the front surface 182 to accept the radially extending shoulder surfaces 192 of the handle shaft 172 into the retention groove 194.

With reference again to FIGS. 4 and 5, the base 102 further defines a cavity 200 opening from the ledge 132 and in communication with the handle slot 180. The first magnet 164 is retentively supported, in the cavity 200 defined by the base 102, by the handle 162 in a first retention slot 202 defined at the handle shaft 172. The first magnet 164 is subject to rotation as the handle shaft 172 and the remainder of the handle 162 is rotated by an operator's manipulation of the handle knob 170. The second magnet 166 is retentively supported by the edge probe 104 in communication with the cavity 200 defined by the base 102 in a second retention slot 206 defined at the underside of the platform 140.

The first magnet 164 and the second magnet 166 may, as shown, be generally cylindrically shaped, although it will be understood that either or both of the first magnet 164 and the second magnet 166 could be otherwise shaped. According to this configuration the actuator 160 and the handle 162, the first magnet 164 can be diametrically magnetized and arranged along the handle shaft 172, normally to the direction of the movement of the edge probe 104 to the extended position E, while the second magnet 166 can be axially magnetized and arranged in the direction of the movement of the edge probe 104 to the extended position E, for instance.

Accordingly, as the handle shaft 172 and the remainder of the handle 162 is rotated by an operator's manipulation of the handle knob 170, and this rotation is imparted to the first magnet 164, the first magnet 164 can be rotated into magnetic opposition to the second magnet 166 in the direction of the movement of the edge probe 104 to the extended position E to operate the actuator 160 to actuate the movement of the edge probe 104 to the extended position E. It will be understood that the first magnet 164 may also be rotated out of magnetic opposition to the second magnet 166 in the direction of the movement of the edge probe 104 to the extended position E, allowing for the return movement of the edge probe 104 to the withdrawn position W.

Although the actuator 160, the handle 162 and related features of the base 102 and edge probe 104 are illustrated and described with reference to the example where the second magnet 166 is retentively supported by the edge probe 104 and the first magnet 164 is retentively supported by the handle 162, which in turn is supported by the base 102, it will be understood that these teachings are equally applicable in principle to alternative examples where, for instance, the handle 162 is supported by the edge probe 104, with the first magnet 164 retentively supported by the base 102 and the second magnet 166 retentively supported by the handle 162.

In general, the gap assessment tool 100 facilitates an operator's assessment of the gap 42 between the exterior exhaust element 30 and the edge 40 of the exterior body panel 22a by adjusting to the gap 42 during the installation of the gap assessment tool 100 between the exterior exhaust element 30 and the edge 40 of the exterior body panel 22a, as described above, and by providing the operator with pairs 210 of defined measurement locations 212 and 214.

In the gap assessment tool 100, each pair 210 of defined measurement locations 212 and 214 is divided between the base 102 and the edge probe 104, with the base 102 including the firsts 212 of the pairs 210 of the defined measurement locations 212 and 214, and the edge probe 104 including the seconds 214 of the pairs 210 of the defined measurement locations 212 and 214. With this arrangement, during the installation of the gap assessment tool 100 between the exterior exhaust element 30 and the edge 40 of the exterior body panel 22a, each pair 210 of defined measurement locations 212 and 214 adjusts to the gap 42 along with the remainder of the gap assessment tool 100 as the extended position E is set according to the movement of the edge probe 104 necessary for the edge probe 104 to contact the edge 40 of the exterior body panel 22a.

The gap assessment tool 100 may, as shown, include two pairs 210 of defined measurement locations 212 and 214, although alternatively the gap assessment tool 100 could, for example, define one pair 210 of defined measurement locations 212 and 214 or more than two pairs 210 of defined measurement locations 212 and 214. In examples of the gap assessment tool 100 including multiple pairs 210 of defined measurement locations 212 and 214, the pairs 210 of defined measurement locations 212 and 214 may, as shown, be spaced from one another about the gap assessment tool 100 to respectively correspond to different parts of the gap 42.

Figure 7C:
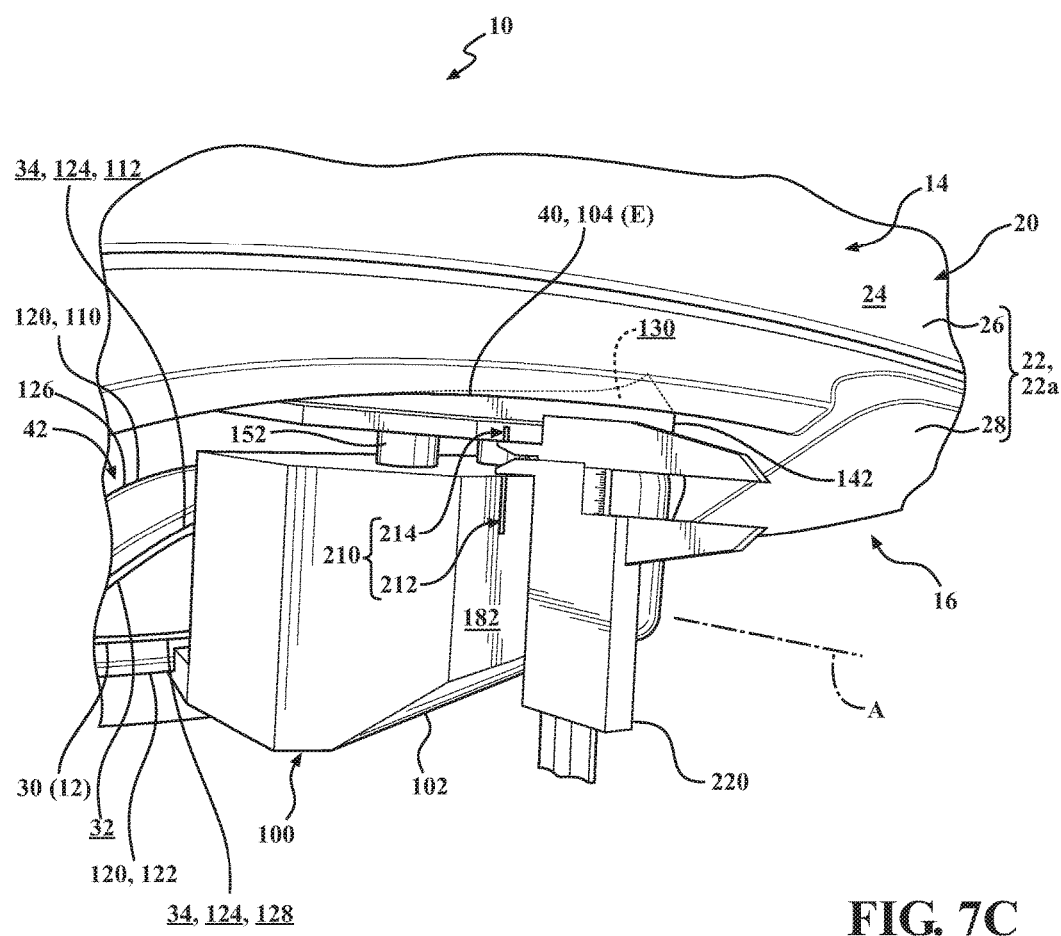
FIG. 7C is a rear view of the vehicle showing the gap assessment tool installed between the exterior exhaust element and the edge of the exterior body panel, and a measurement indicative of a part of the gap being taken between one of the pairs of defined measurement locations.

As shown with additional reference to FIG. 7C, with the gap assessment tool 100 installed between the exterior exhaust element 30 and the edge 40 of the exterior body panel 22a, and with the pairs 210 of defined measurement locations 212 and 214 adjusted to the gap 42, an operator can take measurements indicative of different parts of the gap 42 between the respective pairs 210 of defined measurement locations 212 and 214. These measurements can be compared against reference values to inform the operator, on the one hand, if the gap 42 is satisfactory, or on the other hand, if the gap 42 is too large, too small, uneven, inconsistent with a gap 42 between another exterior exhaust element 30 and the edge 40 of the exterior body panel 22a in the same vehicle 10, inconsistent with the gaps 42 between the exterior exhaust elements 30 and the edges 40 of the exterior body panels 22a in like vehicles 10 or otherwise unsatisfactory.

In use, the gap assessment tool 100 may reduce or eliminate one, some or all of the difficulties in taking take direct measurements of one or more parts of the gap 42 between the exterior exhaust element 30 and the edge 40 of the exterior body panel 22a.

The defined measurement locations 212 and 214, for instance, are identifiable features to measure between, which, as a product of their smooth profiles, are otherwise absent in the exterior exhaust element 30 and the edge 40 of the exterior body panel 22a. As shown, the firsts 212 of the pairs 210 of defined measurement locations 212 and 214 can be arranged at the at the front surface 182 of the base 102 opposing the adaptor 120, and the seconds 214 of the pairs 210 of defined measurement locations 212 and 214 can be arranged in opposition to the firsts 212 of the pairs 210 of defined measurement locations 212 and 214 at the ledge 132 of the edge probe 104, for example, to arrange the pairs 210 of defined measurement locations 212 and 214 for access by an operator.

The pairs 210 of defined measurement locations 212 and 214 can additionally, for example, be arranged in a common plane normal to the axis A of the base 102. In this arrangement, with the gap assessment tool 100 installed between the exterior exhaust element 30 and the edge 40 of the exterior body panel 22a and the axis A aligned in parallel with the exterior exhaust element 30, the pairs 210 of defined measurement locations 212 and 214 are arranged in a common plane normal to the exterior exhaust element 30 irrespective of whether, for instance, the exterior exhaust element 30 sits forward or rearward from the edge 40 of the exterior body panel 22a.

According to the illustrated example of the gap assessment tool 100, the measurements between the pairs 210 of defined measurement locations 212 and 214 may be taken, for instance, with an external measurement tool, such as the calipers 220 shown in FIG. 7C. As shown, the base 102 may include the firsts of pairs of landings for an external measurement tool at the firsts 212 of the pairs 210 of defined measurement locations 212 and 214, and the edge probe 104 may include the seconds of the pairs of landings for an external measurement tool at the seconds 214 of the pairs 210 of defined measurement locations 212 and 214 which, for the calipers 220, are structured as landing notches for its inside jaws.

The gap assessment tool 100 may also be configured to locate the pairs 210 of defined measurement locations 212 and 214 and the remainder of the gap assessment tool 100 relative to the exterior exhaust element 30 and the edge 40 of the exterior body panel 22a during the installation of the gap assessment tool 100 between the exterior exhaust element 30 and the edge 40 of the exterior body panel 22a in order to promote both accuracy in the measurements between the pairs 210 of defined measurement locations 212 and 214 for the vehicle 10 and repeatability in these measurements for like vehicles 10. In the illustrated example of the vehicle 10, for instance, the exterior exhaust element 30, as a product of its non-uniform profile, lends itself to configuring the adaptor 120 to, in use, collar the exterior exhaust element 30 in only one orientation to fit and attach the base 102, via the adaptor 120, to the exterior exhaust element 30.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A gap assessment tool, comprising:
   a base that fits to an exterior exhaust element of a vehicle, the base including the first of a pair of defined measurement locations; and
   an edge probe supported by the base for movement to an extended position in which, with the base fitted to the exterior exhaust element, the edge probe contacts an edge of an exterior body panel of the vehicle spaced from the exterior exhaust element, the edge probe including the second of the pair of defined measurement locations, wherein:
   with the base fitted to the exterior exhaust element, and with the edge probe moved to the extended position and contacting the edge of the exterior body panel, a measurement between the pair of defined measurement locations is indicative of a part of a gap between the exterior exhaust element and the edge of the exterior body panel.

2. The gap assessment tool of claim 1, wherein:
   the base includes the firsts of multiple pairs of defined measurement locations,
   the edge probe includes the seconds of the pairs of defined measurement locations, and
   with the base fitted to the exterior exhaust element, and with the edge probe moved to the extended position and contacting the edge of the exterior body panel, measurements between the pairs of defined measurement locations are indicative of respective different parts of the gap between the exterior exhaust element and the edge of the exterior body panel.

3. The gap assessment tool of claim 1, wherein:
the base includes the first of a pair of landings for an external measurement tool at the first of the pair of defined measurement locations, and
the edge probe includes the second of the pair of landings for an external measurement tool at the second of the pair of defined measurement locations.

4. The gap assessment tool of claim 1, wherein:
the base has an axis that is alignable in parallel with the exterior exhaust element, and
the first and the second of the pair of defined measurement locations are arranged in a common plane normal to the axis.

5. The gap assessment tool of claim 1, wherein the base includes a tubular adaptor that collars the exterior exhaust element to fit and attach the base, via the adaptor, to the exterior exhaust element.

6. The gap assessment tool of claim 1, wherein the edge probe is supported by the base for movement to the extended position from a withdrawn position permissive of the base's fitment to the exterior exhaust element.

7. The gap assessment tool of claim 1, wherein:
the base defines one or more guide slots extending in the direction of the edge probe's movement to the extended position, and
the edge probe includes one or more complementary guide shafts supported in respective of the one or more guide slots in sliding engagement permissive of the edge probe's movement to the extended position.

8. The gap assessment tool of claim 1, further comprising:
an actuator between the base and the edge probe, the actuator actuating the edge probe's movement to the extended position.

9. The gap assessment tool of claim 8, wherein the actuator biases the edge probe away from the base in the direction of the edge probe's movement to the extended position to actuate the edge probe's movement to the extended position.

10. The gap assessment tool of claim 8, further comprising:
a handle that selectively operates the actuator.

11. The gap assessment tool of claim 10, wherein the actuator includes a first magnet positioned against the base and a second magnet positioned against the edge probe, with one of the first magnet and the second magnet supported for selective placement, via the handle, into magnetic opposition to the other of the first magnet and the second magnet in the direction of the edge probe's movement to the extended position to actuate the edge probe's movement to the extended position.

12. The gap assessment tool of claim 10, wherein:
the handle is supported by the base for selective rotation,
the actuator includes a first magnet supported by the handle, with the handle imparting its rotation to the first magnet, and a second magnet positioned against the edge probe, and
with rotation of the first magnet via rotation of the handle, the first magnet is placed into magnetic opposition to the second magnet in the direction of the edge probe's movement to the extended position to actuate the edge probe's movement to the extended position.

13. A gap assessment tool, comprising:
a base, the base including an adaptor that collars an exterior exhaust element of a vehicle to attach the base, via the adaptor, to the exterior exhaust element, and the first of a pair of defined measurement locations;
an edge probe supported by the base for movement to an extended position in which, with the base attached, via the adaptor, to the exterior exhaust element, the edge probe contacts an edge of an exterior body panel of the vehicle spaced from the exterior exhaust element, the edge probe including the second of the pair of defined measurement locations;
an actuator between the base and the edge probe, the actuator biasing the edge probe away from the base in the direction of the edge probe's movement to the extended position to actuate the edge probe's movement to the extended position; and
a handle that selectively operates the actuator, wherein:
with the base attached, via the adaptor, to the exterior exhaust element, and with the edge probe moved to the extended position and contacting the edge of the exterior body panel, a measurement between the pair of defined measurement locations is indicative of a part of a gap between the exterior exhaust element and the edge of the exterior body panel.

14. The gap assessment tool of claim 13, wherein:
the base includes the firsts of multiple pairs of defined measurement locations,
the edge probe includes the seconds of the pairs of defined measurement locations, and
with the base attached, via the adaptor, to the exterior exhaust element, and with the edge probe moved to the extended position and contacting the edge of the exterior body panel, measurements between the pairs of defined measurement locations are indicative of respective different parts of the gap between the exterior exhaust element and the edge of the exterior body panel.

15. The gap assessment tool of claim 13, wherein:
the base includes the first of a pair of landings for an external measurement tool at the first of the pair of defined measurement locations, and
the edge probe includes the second of the pair of landings for an external measurement tool at the second of the pair of defined measurement locations.

16. The gap assessment tool of claim 13, wherein:
the adaptor is tubular and extends along an axis of the base that is alignable in parallel with the exterior exhaust element with the attachment of the base, via the adaptor, to the exterior exhaust element, and
the first and the second of the pair of defined measurement locations are arranged opposite the adaptor in a common plane normal to the axis.

17. The gap assessment tool of claim 13, wherein the edge probe is supported by the base for movement to the extended position from a withdrawn position permissive of the base's attachment, via the adaptor, to the exterior exhaust element.

18. The gap assessment tool of claim 13, wherein:
the base defines one or more guide slots extending in the direction of the edge probe's movement to the extended position, and
the edge probe includes one or more complementary guide shafts supported in respective of the one or more guide slots in sliding engagement permissive of the edge probe's movement to the extended position.

19. The gap assessment tool of claim 13, wherein the actuator includes a first magnet positioned against the base and a second magnet positioned against the edge probe, with one of the first magnet and the second magnet supported for selective placement, via the handle, into magnetic opposition to the other of the first magnet and the second magnet in the direction of the edge probe's movement to the extended position to actuate the edge probe's movement to the extended position.

20. The gap assessment tool of claim 13, wherein:
the handle is supported by the base for selective rotation,
the actuator includes a first magnet supported by the handle, with the handle imparting its rotation to the first magnet, and a second magnet positioned against the edge probe, and
with rotation of the first magnet via rotation of the handle, the first magnet is placed into magnetic opposition to the second magnet in the direction of the edge probe's movement to the extended position to actuate the edge probe's movement to the extended position.

* * * * *